Patented Jan. 26, 1954

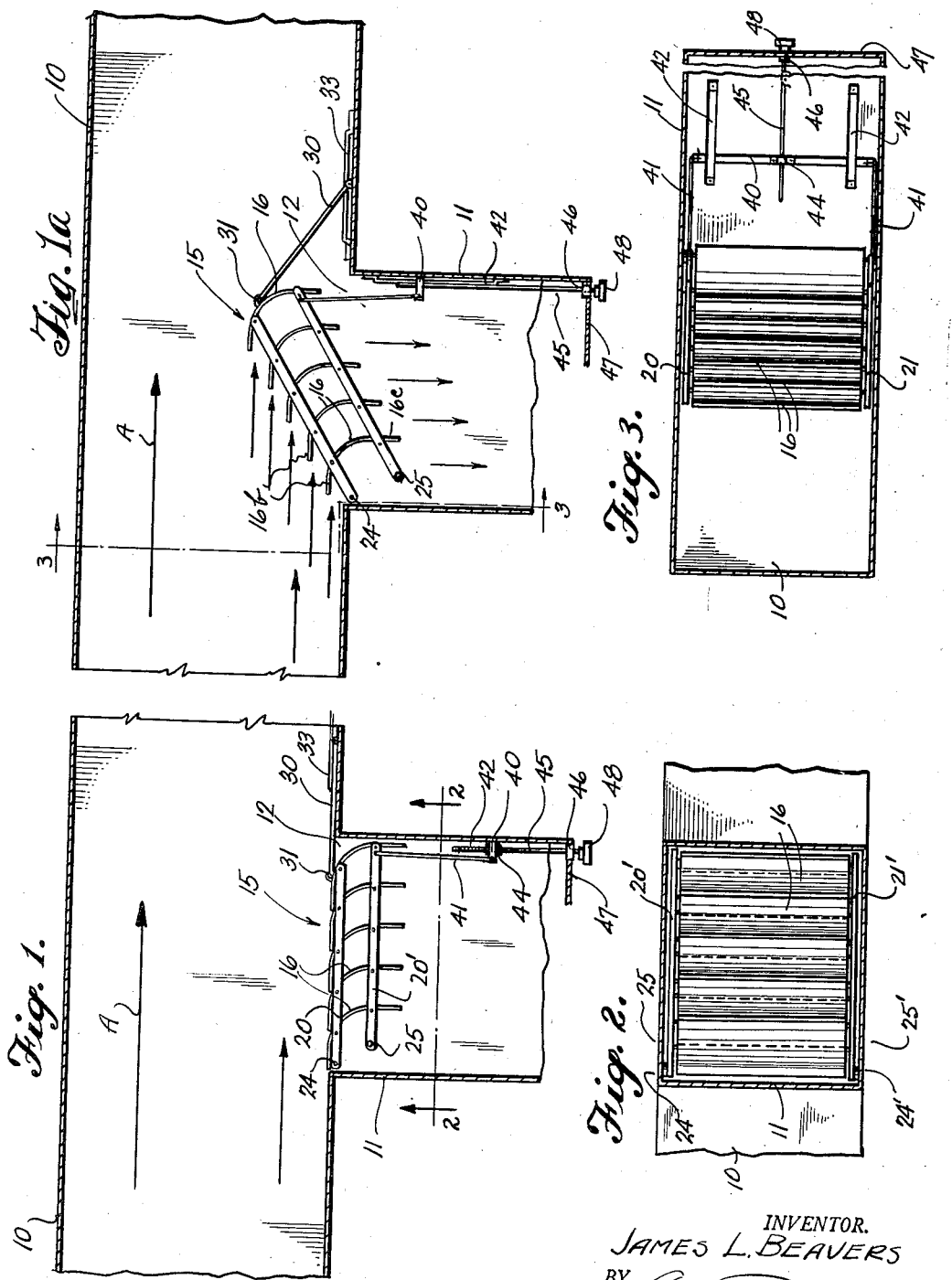
Jan. 26, 1954
J. L. BEAVERS
FLUID DIVERTER
2,667,185
Filed Feb. 13, 1950
3 Sheets-Sheet 1
INVENTOR.
JAMES L. BEAVERS
BY
Cook & Robinson
ATTORNEYS Jan. 26, 1954    J. L. BEAVERS    2,667,185
FLUID DIVERTER
Filed Feb. 13, 1950    3 Sheets-Sheet 2
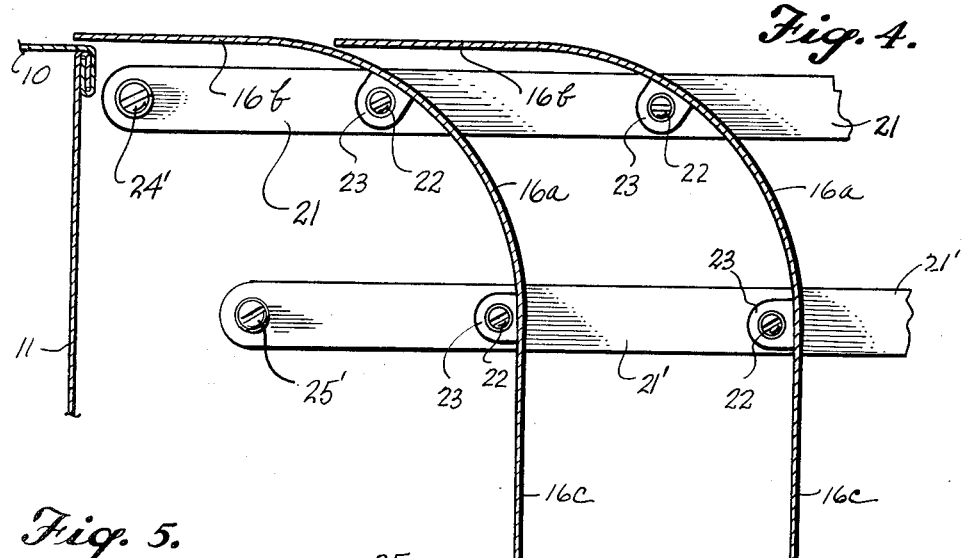
Fig. 4.
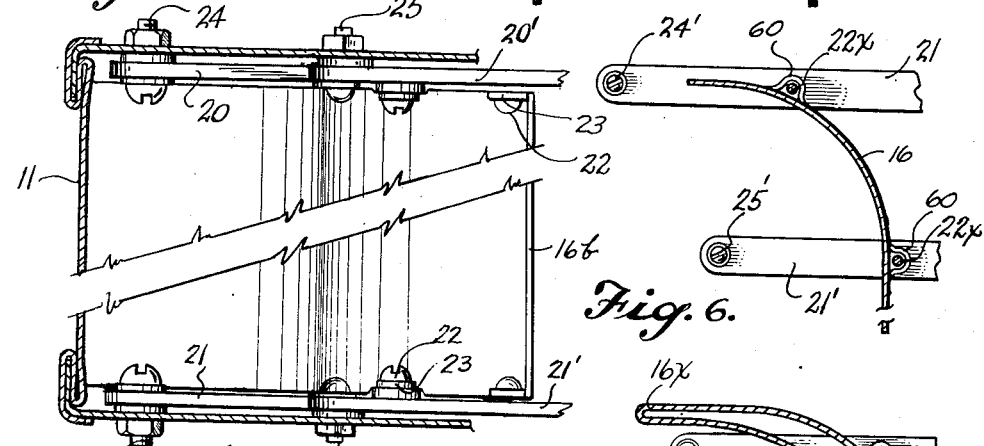
Fig. 5.
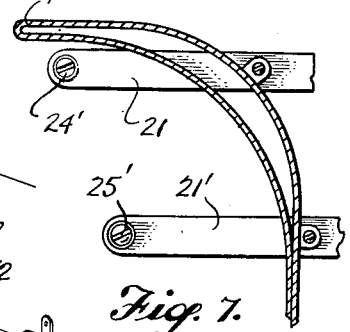
Fig. 6.
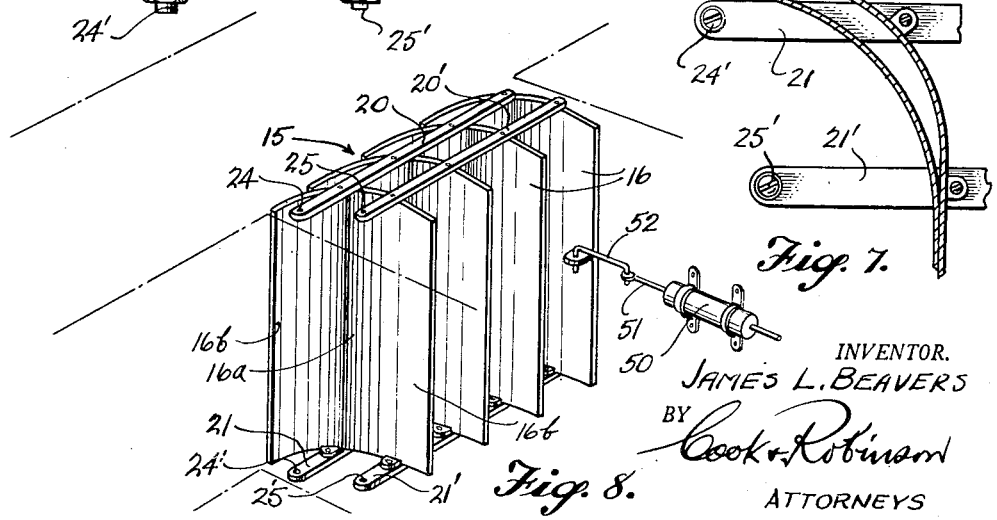
Fig. 7.
Fig. 8.
INVENTOR.
JAMES L. BEAVERS
BY
Cook & Robinson
ATTORNEYS

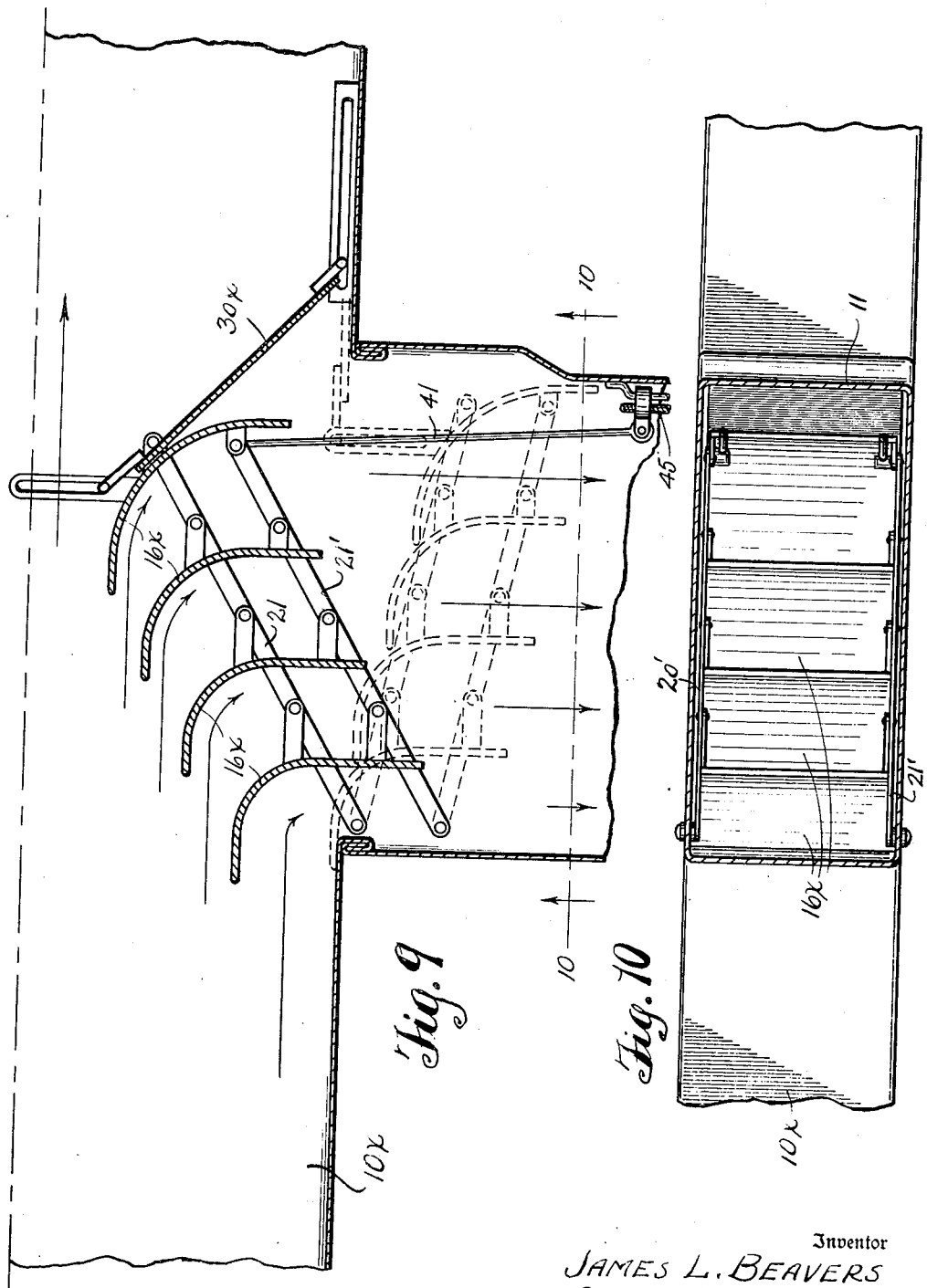

2,667,185

UNITED STATES PATENT OFFICE 2,667,185

FLUID DIVERTER

James L. Beavers, Yakima, Wash.

Application February 13, 1950, Serial No. 143,927

1 Claim. (Cl. 138—37)

This invention relates to air diverters and means for their control. More particularly, the present invention has reference to a diverter of improved kind designed for use in an air delivery duct for the diverting of a part of the flowing stream of air from the duct into a branch stream or lateral duct.

It is the principal object of this invention to provide an improved diverter means for turning fluid flow from a main stream into a branch stream. Furthermore, to provide a means whereby the proportionate amount diverted from the main stream may be established at any amount between zero flow and the maximum amount that may be diverted by the device.

It is also an object of this invention to provide a diverter that lends itself to operation under remote control, and to provide simple, practical and effective means for its control either by manually operated or by mechanical means.

It is a further object of the invention to provide a diverter whereby laminar flow of the fluid is maintained in the stream as diverted from a main duct to a lateral duct, and to accomplish the diversion of any proportionate amount without causing any disturbing turbulence in the main stream.

Still another object of the invention is to provide air diverting means that simplifies the construction of present day air duct systems, and systems of air distribution, by the elimination of the multiplicity of devices now used for proportioning, diverting and controlling the flow of air in duct systems.

In accomplishing the above mentioned and other objects of my invention, I have provided the improved details of construction, the preferred forms of which are illustrated in the accompanying drawings, wherein—

Fig. 1 is a horizontal sectional view of a part of a duct system equipped with a diverter embodied by the present invention; the assembly of diverter vanes being shown in closed or "non-diverting" position.

Fig. 1a is a similar view, showing the diverter vanes in a position for diverting the flowing medium from the main duct into the lateral duct.

Fig. 2 is a vertical section taken on line 2—2 in Fig. 1.

Fig. 3 is a vertical section taken on line 3—3 in Fig. 1a.

Fig. 4 is an enlarged sectional detail of a part of the diverter, particularly illustrating the form and relationship of the diverting vanes.

Fig. 5 is an enlarged sectional detail, showing the upper and lower sets of parallel links which mount the diverting vanes therebetween.

Fig. 6 is a sectional detail, illustrating an alternative vane mounting means.

Fig. 7 is a sectional detail showing an alternate form of diverting vane construction.

Fig. 8 is a perspective view of a set of vanes and their mounting links, and a mechanical actuator for the set of vanes.

Fig. 9 is a view illustrating a modification of the diverter vane arrangement for accomplishing the even proportioning of quantities of fluid in laminar streams as diverted from a duct in which the fluid in different parts of the duct flows with varying velocities.

Fig. 10 is a cross-section on line 10—10 in Fig. 9.

It is to be understood that the present invention is applicable for use for the diversion of air, water and other fluids. The present structure is made primarily for the diverting of air streams, and the parts used and their relationship has been arranged accordingly. However, the same elements can be used in like manner for the diversion of water or other fluids of more or less weight and degree of solidity, without departing from the spirit of the invention. Therefore, while in the following description, the diverted or flowing medium will be referred to as air, it is with the understanding that it is not to be restricted thereto.

Referring more in detail to the drawings—

For the purpose of illustration, I have shown, in Figs. 1 and 1a, a main air duct 10 of rectangular cross-sectional form, equipped with a lateral duct 11, also of rectangular cross sectional form, leading from an opening 12 in a side wall of the main duct. The direction of flow of air in the main duct is indicated by the arrow A therein.

Located in the duct 11, at the entrance thereinto from duct 10, is a diverter unit which is designated in its entirety by numeral 15; the unit is best shown in Fig. 8.

The diverter, in one of its present preferred forms of construction as used for air diversion, comprises a plurality of turning vanes 16, of suitable size, and shape. Each vane comprises a plate of rectangular form, which may be of metal, plastic or any suitable material, and so curved that it has a substantially cylindrically curved medial portion, designated at 16a in Fig. 4, and straight opposite end portions 16b and 16c continuing tangentially therefrom and extending in planes at right angles to each other; the curved medial part of the vane comprises approximately the central third thereof as will be observed in Fig. 4, but this is not a critical condition nor a requirement.

The several vanes 16 of the diverter are disposed in parallel relationship, all faced in the same direction, and disposed with the end portions 16b thereof pointing a direction directly opposite that of the flow of air in the duct 10, while the end portions 16c are directed into the duct 11.

As noted in Figs. 2 and 3, the several vanes 16 of the air diverter, are evenly aligned at their upper and lower ends. Extended directly across the several vanes, at their upper ends, are parallel links 20—20', and likewise, extending directly across the lower ends of the vanes are parallel links 21—21'. The pairs of parallel links at the opposite ends of the vanes are pivotally attached thereto, by pivot screws or bolts 22 as seen in Figs. 4 and 5; corresponding pivots 22 of the links being equidistant from the link pivots 24 and 25. The pivots 22 extend through the links and are fixed in ears 23 that are turned laterally from the end edges of the vanes. The ears 23 may be separate parts and attached to the vane by spot welding, riveting or other means.

The links 20 and 21, of the upper and lower sets of links, as seen in the various views of the drawings, have their left hand ends in vertical alignment, and pivotally attached to upper and lower walls of the duct 11 by axially aligned pivot bolts 24—24' located approximately at the line of intersection of the side walls of the main duct 10 and the left hand side wall of duct 11. The links 20' and 21' of the two sets of links have their left hand ends pivotally secured by bolts 25—25' to the upper and lower walls of duct 11, in vertical alignment, but inwardly offset from the adjacent side wall of the duct 11 and from the pivot line of bolts 24—24'. The relative position of the links at upper and lower ends of the vanes, and the position or relationship of the pivot axes about which they are adapted to swing, is such that the assembly of vanes may be swung from a position within the entrance opening 12 into duct 11, as in Fig. 1, to a position extended angularly into the duct 10 to more or less extent, as in Fig. 1a.

When in the position of Fig. 1, within the entrance to duct 11, the diverter vanes have no diverting effect on the stream of air. In fact, the end portions 16b thereof overlap with each other in such manner as to form a continuous closure wall for the opening 12. However, in the position of Fig. 1a, or when at any other position, more or less extended into duct 10, the vanes will operate to divert a part of the air stream from duct 10 into duct 11, each vane operating to slice off a part of the stream, thus to result in laminar flow of the diverted air in entering the duct 11.

It is a feature of this construction, that through the mediacy of the pairs of links, 20—20' and 21—21', the vanes at all positions of diverting adjustment will maintain the same position relative to direction of flow of air in duct 10; that is, the end portions 16b of the vanes always point directly into the oncoming air stream, and the vanes 16c are always parallel with the direction of duct 11.

It would be possible to divert the air from duct 10 to more or less of an angle than shown in Fig. 1a, merely by curving the medial portions of the vanes to more or less extent.

In order to avoid the formation of eddy currents of air or an undesirable turbulence at the leeward side of the diverter, I have attached a trailing baffle plate 30 to the vane 16 at the swinging end of the unit. This baffle which is of the same height as the vanes, is hinged to the vane as indicated at 31 and has a sliding connection at its opposite edge with guide rods 33 fixed to extend along the side wall of duct 10. Thus, as the diverting unit swings from closed position as in Fig. 1 to an open position, the baffle moves therewith as will be understood by reference to Fig. 1a, and thus keeps the flowing stream of air in duct 10 from swirling in back of the free or swinging end of the diverter unit.

To effect adjustment of the assembly of diverter vanes from the position of Fig. 1 to an open or diverting position, I may employ either a manually operable or mechanically operable means. In Fig. 1 I have shown a manual means which comprises a vertical bar 40 mounted on a side wall of the duct 11 for movement toward and from the opening 12. This bar is connected at its upper and lower ends by means of links 41—41, with the swinging ends of links 20' and 21' respectively. The bar 40 is guided in its travel by bars 42—42 fixed to the duct wall and between its ends the bar 40 has a bearing block 44 fixed thereon. An adjusting rod 45 is threaded through bearing 44 and also has a rotatably fixed mounting in bearing 46 that is fixed in a duct wall 47. On the outer end of the rod 45 is a turning knob 48. By rotatably adjusting the knob, the bearing block 44 is caused to travel along the rod and to move the bar 40 accordingly, thus to adjust the swinging end of the diverter unit accordingly.

In Fig. 8 I have shown mechanical means for effecting the diverter adjustment. This comprises a fluid pressure cylinder 50 that is fixedly mounted on a side wall of the duct 11 or other stationary member. The piston rod 51 is connected pivotally by a link 52 with a lug on the vane 16 at the outer end of the diverter unit. Thus by a controlled application of fluid pressure medium to the cylinder, the rod 51 may be extended or retracted to adjust the diverter unit accordingly.

Fig. 6 shows an alternative means for mounting the vanes 16. In this design the vanes have loops 60 struck outwardly therefrom, and studs 22x or rods are applied through these loops and fixed in the supporting links 20—20' and 21—21'.

Fig. 7 illustrates an alternative vane construction. The vane comprises a plate 16x of metal that is doubled back upon itself and its ends joined together. The double thickness gives additional strength and by giving the medial portions different degrees of curvature they will be spaced and the vane thereby given unusual rigidity.

In Fig. 9 I have shown a graduated spacing of the diverter vanes to cause laminar streams of equal volumes of fluid to be diverted from a main duct in which the fluid in different parts of the duct flows at different velocities.

In this view, the main duct is designated at 10x, and it is to be explained that the fluid stream therein flows fastest at the center of the duct and gradually at slower rate from the center toward the side walls. Therefore in order that the laminar streams that are diverted by the several vanes be of equal volume, it is necessary that the spacing of the vanes on the adjusting links be graduated accordingly.

In this arrangement, the vanes 16x are substantially the same shape as those previously described, but are so spaced in their mounting that the vanes, in succession from the pivoted ends of the links 20—21, will slice off streams of fluid of lesser width as may be required, in view of the increase of rate of flow of air from the outside toward the center of the duct, to cause the individual laminar streams to be made of equal volume as delivered into the lateral duct. It is to be noted that the disposition of vanes is such that the proportionate decrease in width of the laminar streams as sliced off by the successive vanes remains the same regardless of the extent to which the vanes are swung into the main duct.

In this arrangement of Fig. 9, a baffle 30x is employed to prevent eddy currents, when the vanes are in diverting position.

It is apparent that in carrying out the objects of the present invention, details of construction might be altered to considerable extent without departing from the spirit of the invention. Therefore it is not desired that the claim be restricted to details, but that it be given an interpretation that is commensurate with the invention disclosed.

The use of the word "air" to designate the kind of diverted fluid, shall be understood to include all fluid medium, that may be diverted, such, for example water, gases or fluid granular materials.

Having thus described my invention, what I claim as new therein and desire to secure by Letters Patent, is:

The combination with a main duct for flow of a stream of fluid medium, and a lateral duct leading from the main duct and means for diverting the medium from the main duct into the lateral duct, said means comprising upper and lower pairs of spaced, parallel links disposed transversely of the lateral duct at the entrance thereof and with ends at one side of the duct pivotally mounted to permit the pairs of links to swing into and from the main duct, and a plurality of curved diverter fins extended between the upper and lower pairs of links in succession and spaced at intervals progressively decreased from the pivoted ends of the parallel links, each fin pivotally attached at its end edges to the paired links, and each fin having a leading edge directed toward and parallel with the flow of medium in the main duct, and a trailing edge directed into the lateral duct, said fins being spaced along the links with their leading edge portions overlapped one with the other to close the entrance to the lateral duct when the links are swung into the lateral duct and adapted to open apart to progressively decreased intervals of space incident to the swinging of the links into the main duct.

JAMES L. BEAVERS.

References Cited in the file of this patent

UNITED STATES PATENTS

| Number | Name | Date |
|---|---|---|
| 408,235 | Haskell | Aug. 6, 1889 |
| 2,001,801 | Smith | May 21, 1935 |
| 2,297,979 | Peck | Oct. 6, 1942 |
| 2,364,265 | Brickham | Dec. 5, 1944 |